United States Patent
Baek et al.

(10) Patent No.: US 8,150,963 B2
(45) Date of Patent: Apr. 3, 2012

(54) HOME NETWORK SYSTEM

(75) Inventors: Seung-Myun Baek, Changwon-shi (KR); Koon-Seok Lee, Changwon-shi (KR); Yong-Tae Kim, Gimhae-shi (KR)

(73) Assignee: LG Electronics Inc., Seoul (KR)

( * ) Notice: Subject to any disclaimer, the term of this patent is extended or adjusted under 35 U.S.C. 154(b) by 917 days.

(21) Appl. No.: 11/547,363

(22) PCT Filed: Mar. 31, 2005

(86) PCT No.: PCT/KR2005/000950
§ 371 (c)(1),
(2), (4) Date: Jul. 29, 2008

(87) PCT Pub. No.: WO2005/094195
PCT Pub. Date: Oct. 13, 2005

(65) Prior Publication Data
US 2011/0054644 A1    Mar. 3, 2011

(30) Foreign Application Priority Data
Mar. 31, 2004   (KR) ......................... 10-2004-0022217

(51) Int. Cl.
G06F 15/173 (2006.01)
(52) U.S. Cl. .......................... 709/224; 709/217; 709/223
(58) Field of Classification Search .................. 709/217, 709/223, 224
See application file for complete search history.

(56) References Cited

U.S. PATENT DOCUMENTS 6,243,707 B1 *  6/2001  Humpleman et al. ................. 1/1
6,980,080 B2 * 12/2005  Christensen et al. ........... 340/3.5
7,181,293 B2 *  2/2007  Rothman et al. ................. 700/22
2002/0107984 A1 *  8/2002  Rawson, III .................. 709/246
(Continued)

FOREIGN PATENT DOCUMENTS

CN    1427584 A    7/2003
(Continued)

OTHER PUBLICATIONS

Lee, Koon-Seok et al; "Network configuration technique for home appliances based on LnCP" Jul. 9, 2003; IEEE Transactions on Consumer Electronics; vol. 49, issue 2; pp. 367-374.*

Primary Examiner — Thomas Dailey
(74) Attorney, Agent, or Firm — McKenna Long & Aldridge LLP

(57) ABSTRACT

An electronic device includes an interface unit; a processor configured to communicate with one other electronic device; where a message communicated between the electronic device and the other electronic device includes a message type field and a transmission counter field. The message type field indicates a type of the message. The transmission counter field indicates how many times the same message is transmitted, and a range of a value included in the transmission counter field is determined based on the type of the message indicated by the message type field. The interface unit receives a device information message from the other electronic device, and generates a profile for managing the other electronic device based on the device information message. The profile comprises at least one of a device information file containing specific information on the other electronic device, a node parameter file containing a node parameter designated for the other electronic device, a device operation file containing data on an operational state of the other electronic device, and a scenario file for defining supplementary services for the other electronic device.

13 Claims, 7 Drawing Sheets

U.S. PATENT DOCUMENTS

| | | | |
|---|---|---|---|
| 2002/0163933 A1* | 11/2002 | Benveniste | 370/465 |
| 2002/0165846 A1 | 11/2002 | Richer et al. | |
| 2002/0174433 A1* | 11/2002 | Baumgartner et al. | 725/58 |
| 2003/0131101 A1* | 7/2003 | Lee et al. | 709/224 |
| 2004/0158333 A1 | 8/2004 | Ha et al. | |
| 2005/0289383 A1* | 12/2005 | Illowsky et al. | 714/2 |

FOREIGN PATENT DOCUMENTS

| | | |
|---|---|---|
| JP | 2003-179982 | 6/2003 |
| WO | WO 02/37217 A2 | 5/2002 |
| WO | WO 02/097555 A2 | 12/2002 |

* cited by examiner

| FIXED ADDRESS(8bit) | LOGICAL ADDRESS(8bit) |
|---|---|
| PRODUCT CODE | DEVICE CODE |
|  | CLUSTER CODE |

HOME NETWORK SYSTEM

This application claims the benefit of Korean Patent Application No. 2004-0022217, filed on Mar. 31, 2004 and PCT Application No. PCT/KR2005/000950, filed on Mar. 31, 2005, which are hereby incorporated by reference for all purposes as if fully set forth herein.

TECHNICAL FIELD

The present invention relates to a home network system, and more particularly to, a home network system using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
|---|---|---|
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system. Also, a network protocol in the conventional art home network system does not suggest an effective method for receiving and transmitting a packet.

DISCLOSURE OF THE INVENTION

The present invention is achieved to solve the above problems. An object of the present invention is to provide a home network system using a control protocol which is a general communication standard for providing functions of controlling and monitoring electric devices in the home network system.

Another object of the present invention is to provide a home network system using a living network control protocol (LnCP) as a general communication standard.

Still another object of the present invention is to provide a home network system performing batch processing on components of an entire home network system.

Yet another object of the present invention is to provide a home network system capable of synchronizing information between a plurality of master devices in a home network system.

In order to achieve the above-described objects of the invention, there is provided a home network system including: at least one electric device; a network manager for controlling and monitoring the electric device; and a network based on a predetermined protocol, for connecting the electric device and the network managers, wherein the network manager stores a HOMNET Profile containing information on the electric device, and updates the HOMNET Profile by communicating with the electric device through the network, wherein the HOMNET Profile comprises at least one of a device information file containing specific intrinsic information on the electric device, a node parameter file containing a node parameter designated for the electric device, a device operation file containing data on an operational state of the electric device and a scenario file for defining supplementary services for the electric device.

BEST MODE FOR CARRYING OUT THE INVENTION

A home network system in accordance with the present invention will now be described in detail with reference to the accompanying drawings.

Figure 1:
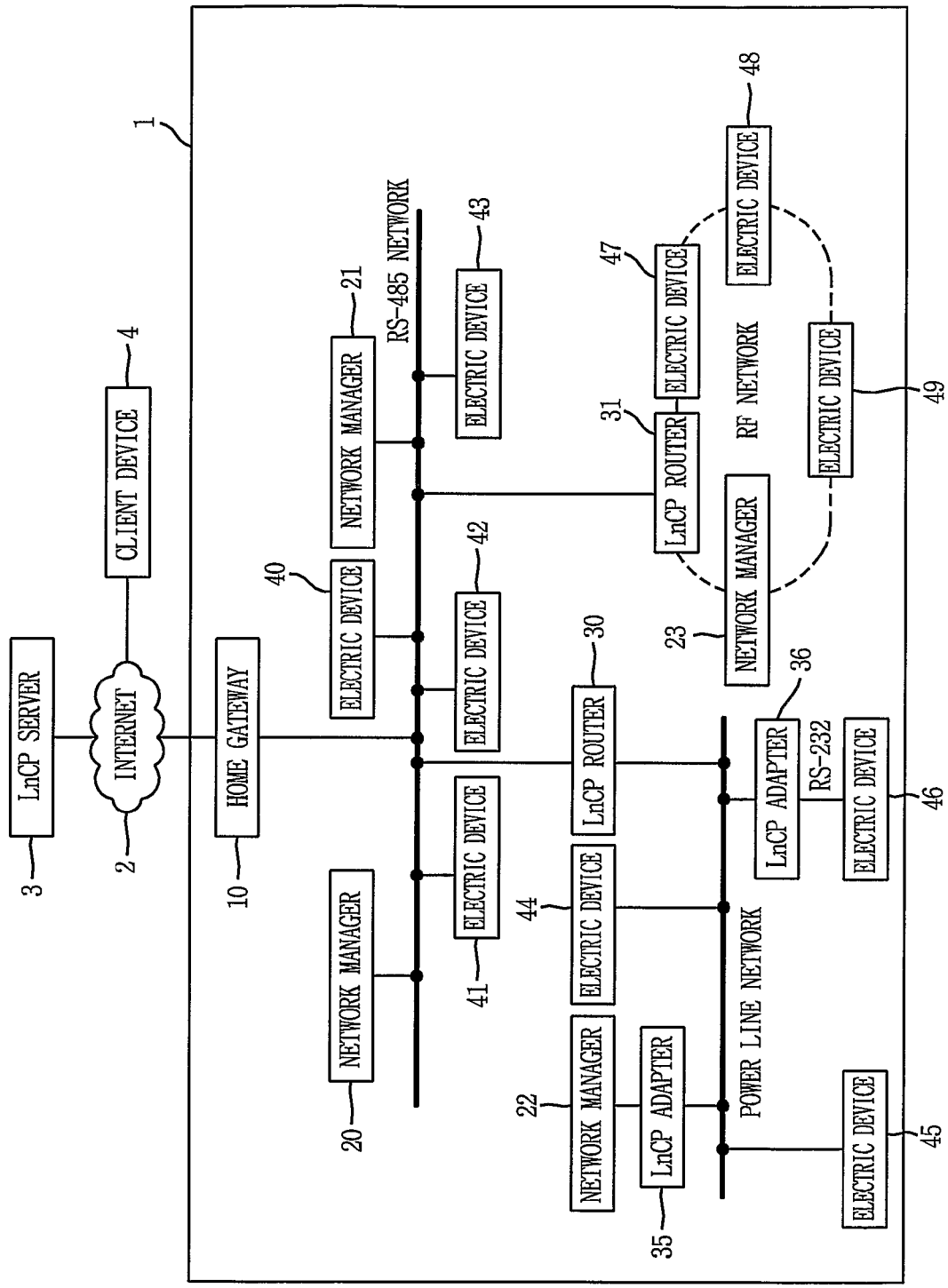
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an Internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS-485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

Figure 2:
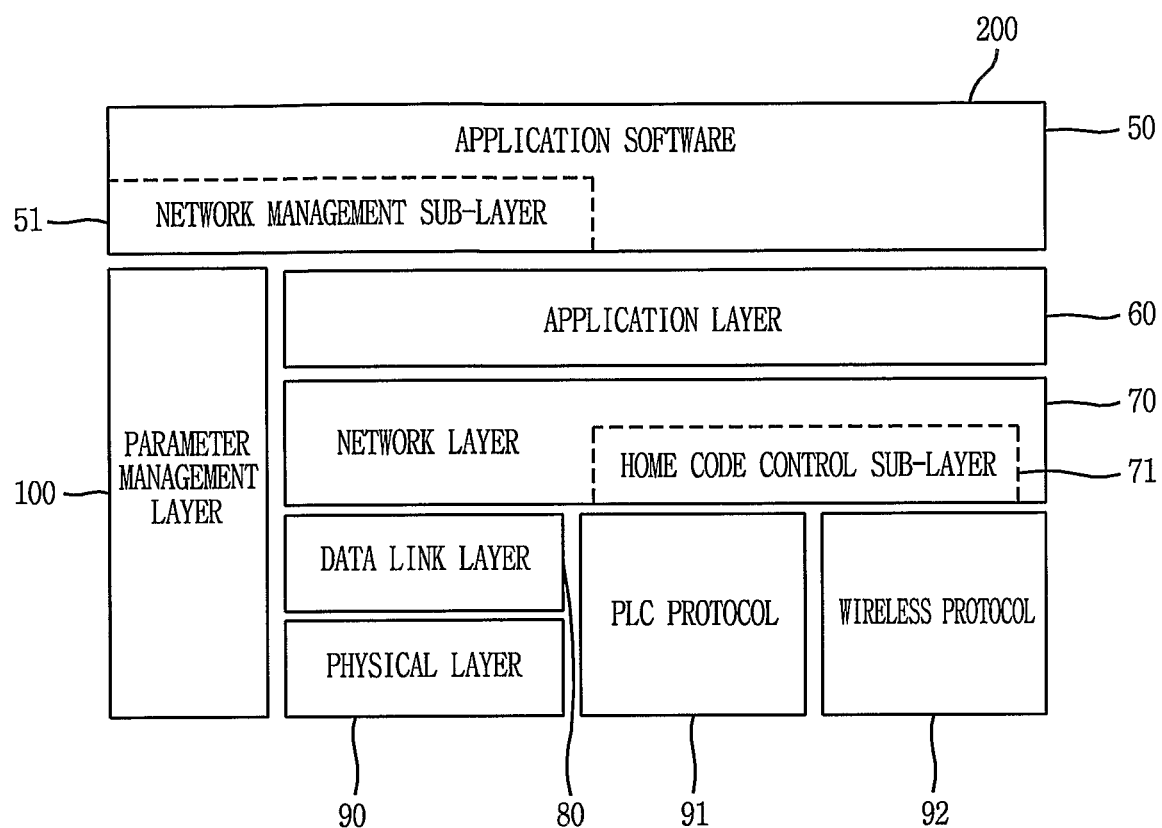
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3:
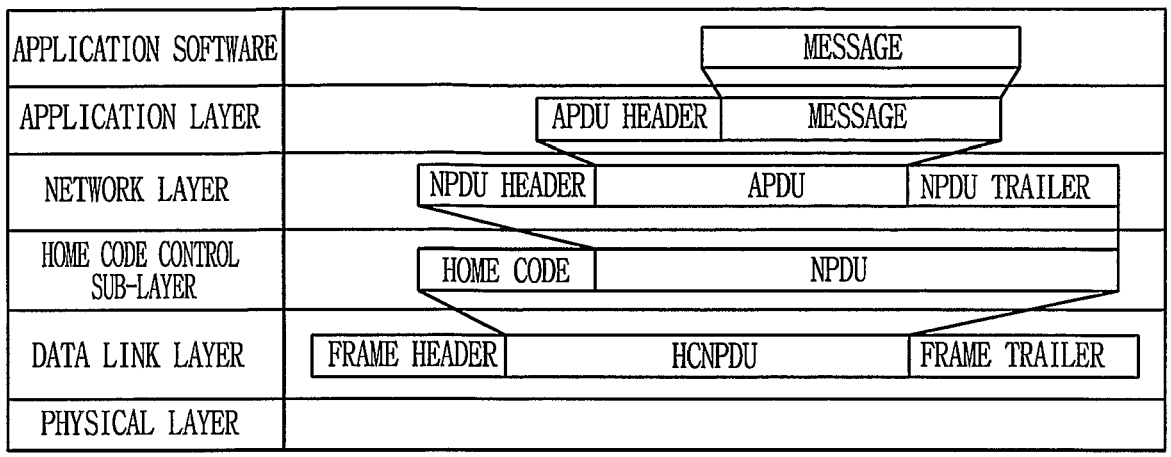
FIGS. 3 and 4 are structure views illustrating interfaces between layers of FIG. 2, respectively.
Figure 4:
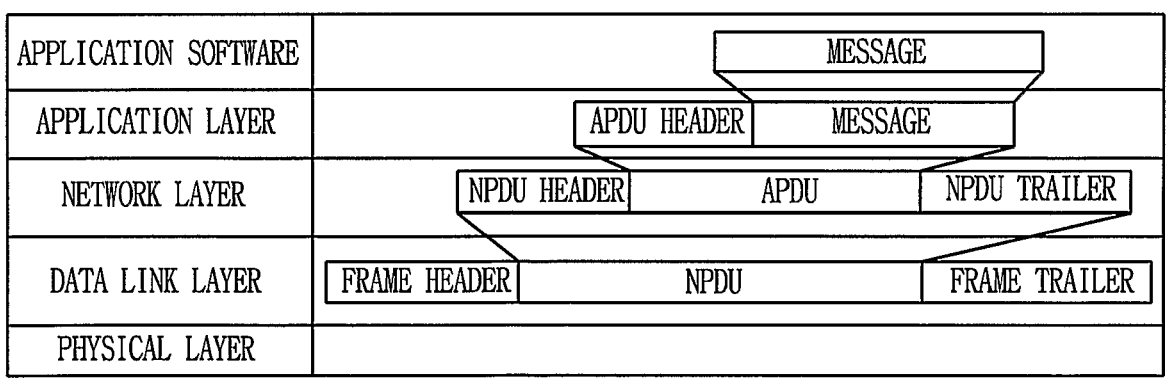

FIGS. 3 and 4 are structure views illustrating interfaces between the layers of FIG. 2, respectively.

FIG. 3 illustrates the interfaces between the layers when the physical layer 90 is connected to the non-independent transmission medium, and FIG. 4 illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3 and 4, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 5 to 10 are detailed structure views illustrating the interfaces of FIGS. 3 and 4, respectively.

Figure 5:
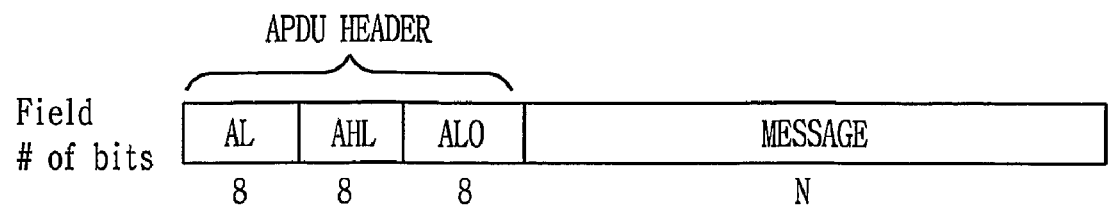
FIGS. 5 to 10 are detailed structure views illustrating the interfaces of FIGS. 3 and 4, respectively.

FIG. 5 illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to AL0), successively has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 6:
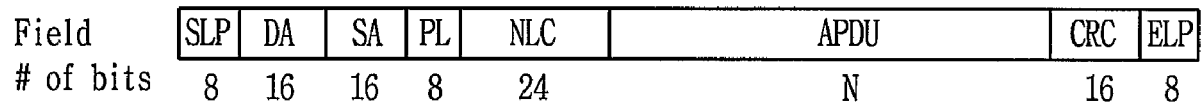
Figure 7:
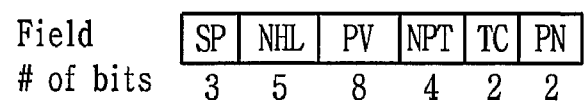

FIG. 6 illustrates the NPDU structure in the network layer 70, and FIG. 7 illustrates a detailed NLC structure of the NPDU.

A start of LnCP packet (SLP) field indicates start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind. A packet length (PL) field shows the total length of NPDU which will be transferred, and its initial length is 15 bytes and its maximum length is 120 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Message type |
|----------|-------|--------------|
| High | 0 | Security related message |
| Middle | 1 | When a normal packet is transmitted |
| | | When an event message for online or offline status change is transmitted |
| Normal | 2 | When a notification message for composing a network is transmitted |
| | | When a normal event message is transmitted |
| Low | 3 | When a data is transmitted by download or upload mechanism |

An NPDU header length (NHL) field extends an NPDU header (NLC field of SLP), successively has 9 bytes, and is extended to a maximum of 17 bytes.

A protocol version (PV) field indicates the employed protocol version and its length is 1 byte. The upper 4 bits show the version, and the lower 4 bits show the sub-version. Version and sub-version use HEX to show their values respectively.

A network layer packet type (NPT) field is a 4-bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Explanation | Value |
|-------------|-------|
| Request packet | 0 |
| reserved | 1~3 |
| Response packet | 4 |
| reserved | 5~7 |
| Notification packet | 8 |
| reserved | 9~12 |
| Reserved value for interface with the home code control sub-layer | 13~15 |

A transmission counter (TC) field is a 2 bit field which retransmits the request packet or repeatedly transfers notification packet in order to enhance the transmission success rate of the notification packet when a communication error occurs in the network layer 70, making it unable to transfer the request packet or response packet properly. Table 4 shows the range of the values of the TC field by the NPT values.

TABLE 4

| Kind of packet | Value (range) |
|----------------|---------------|
| Request packet | 1~3 |
| Response packet | 1 |
| Notification packet | 1~3 |

A packet number (PN) field consists of 2 bytes, and it is used with the TC to detect duplicated packets in the slave device, and it is used to deal with multiple communication cycles in the master device. Table 5 shows the range of the values of the PN field by the NPT values.

TABLE 5

| Kind of packet | Value (range) |
| --- | --- |
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field is the end of the packet with the value 0x03. If the ELP field is not detected in spite of byte length of the received data is the same with the value of packet's length field, this packet will be considered as an error packet.

Figure 8:
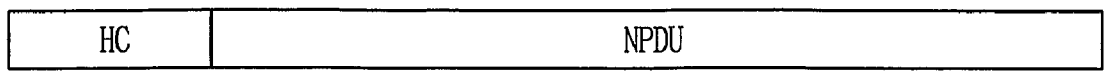

FIG. 8 illustrates the HCNPDU structure in the home code control sub-layer 71.

As depicted in FIG. 8, a home code (HC) field is added to the upper portion of the NPDU.

The home code is comprised of 4 bytes, and has a unique value within the line distance where a packet can be transmitted.

Figure 9:

FIG. 9 illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 10:
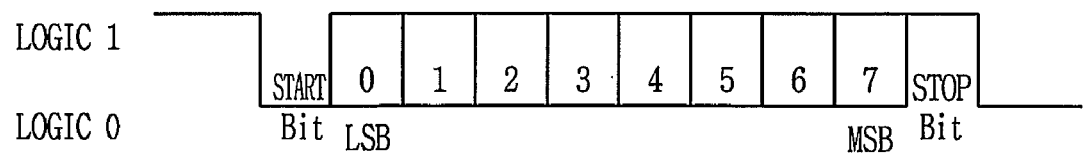

FIG. 10 illustrates a frame structure in the physical layer 90.

The physical layer 90 of the LnCP handles a function of transmitting and receiving a physical signal to a transmission medium. The data link layer 80 can use a non-standardized transmission medium such as RS-485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 10, and transmitted through the transmission medium. The UART frame includes one bit of start bit, 8 bits of data and one bit of stop bit without any parity bit. The start bit is transmitted first, followed by data bits and the stop bit. When the home network system 1 using the LnCP employs the UART, it does not have additional frame header and frame trailer.

Figures 11, 12:
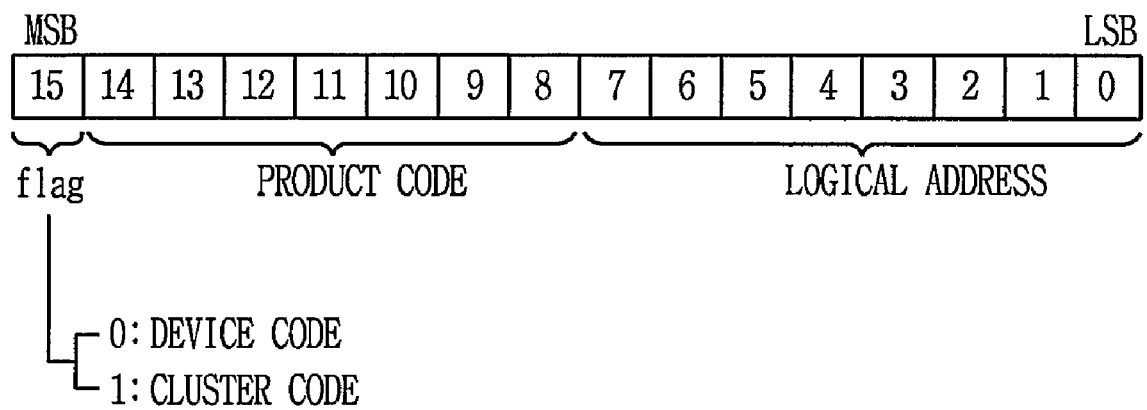
FIGS. 11 and 12 illustrate address systems, respectively, for use in a home network system in accordance with the present invention.

FIGS. 11 and 12 illustrate address systems, respectively, for use in the home network system in accordance with the present invention.

For instance, FIG. 11 illustrates a structure of an address field used in the home network system 1 of the present invention. Referring to FIG. 11, a product code assigned to a device prior to shipment is a unique value based on the product classification for identifying the generic category and function of a device. Therefore, the product code is unique and unchangeable physical address for each device, and products of the same kind have the same fixed address. Next, a device code is a logical address for identifying devices having the same code. Lastly, a cluster code is a logical address assigned to at least one device, conforming to designated regulations.

FIG. 12 is a detailed structure view of the address field of FIG. 11. As shown in FIG. 12, MSB of the fixed address field is used as a flag, in which '0' indicates a device code, and '1' indicates a cluster code. Therefore, the logical address for the device code and the cluster code is distinguished by setting the MSB value in the address field differently. In addition, when every bit value in each subfield is set to 1, it indicates a group address. For instance, when the product code of a refrigerator is 0x01, 0x01FF becomes a group address of refrigerators, and 0x81XX (X: a random number) becomes a group address representing all refrigerators of the same cluster code.

The device code is automatically assigned to each slave device by a master device when the slave devices are connected to the home network system 1. Also, the cluster code can be automatically assigned by a master device. In many cases, however, a user sets the cluster code on account of technical problems.

For example, the electric devices 40 to 49 and/or LnCP routers 30 and 31 and/or LnCP adapters 35 and 36 are identified by the node addresses such as 0x0200 (air conditioner 1) and 0x0201 (air conditioner 2). Also, a group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

During the shipment, the node address consisting of a product code and an initial logical address is stored in predetermined storage means of a master device and slave devices.

Figure 13:
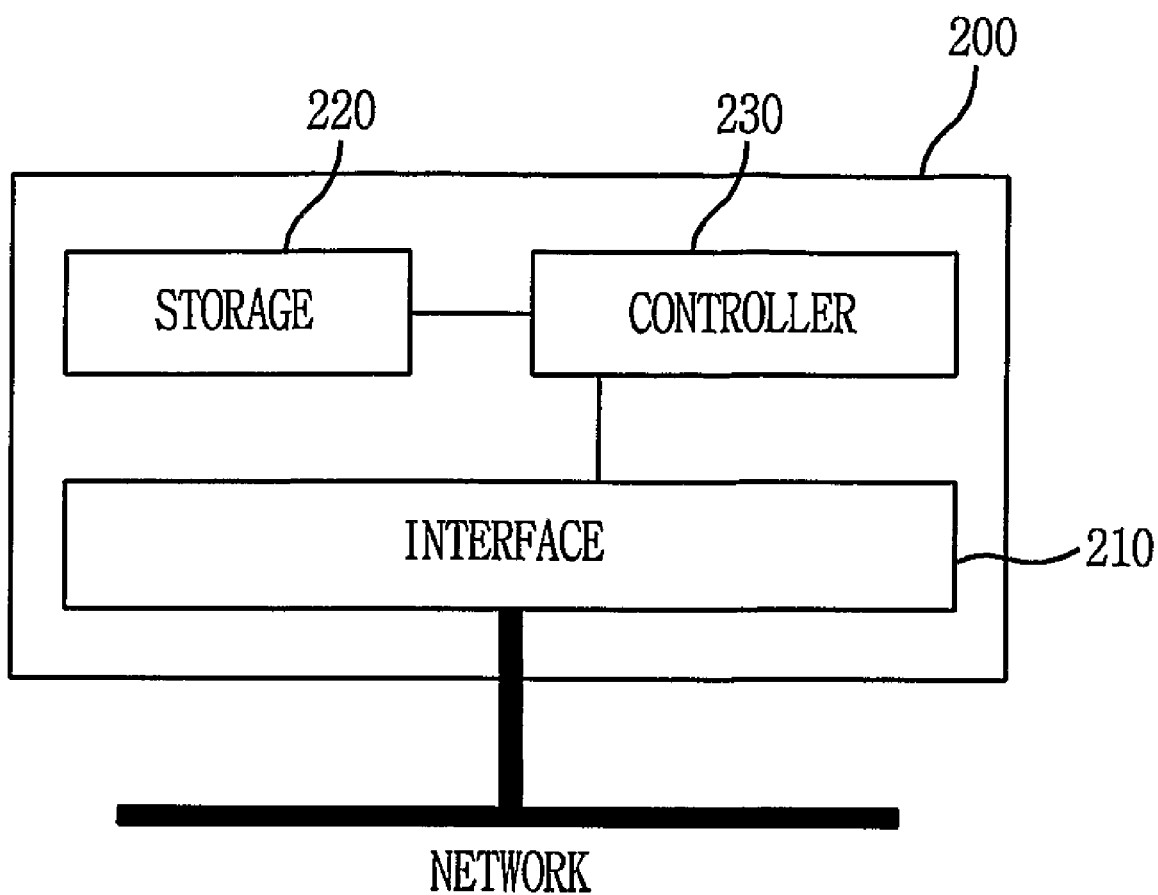
FIG. 13 is a schematic diagram illustrating a common structure between a network manager and an electric device.

FIG. 13 is a schematic diagram illustrating a common structure between a network manager and an electric device.

As shown in FIG. 13, the common structure 200 includes an interface 210 for connecting the network managers 20 to 23 and the electric devices 40 to 49 to the network, a predetermined storage 220, and a controller 230 for controlling the interface 210 and the storage 220 and setting an intrinsic or unique node address for a new device (new electric device or new network manager).

In detail, the storage 220 for the respective network managers 20 to 23 stores product information on other network managers and electric devices 40 to 49, and address information by products. In effect, information on every networked product (e.g., product information and designated & undesignated node address information, etc.) is recorded in form of HOMNET Profile. This HOMNET Profile is stored in the storage 220, and is read and updated by the controller 230.

The storage 220 for the respective electric devices 40 to 49 stores at least a product code and an initial logical address. Later, the storage 220 can further store a temporary logical address and a logical address designated by a master device.

In the following description, one should notice that all operations to be explained later are actually performed by the controller 230 for the network managers 20 to 23 or the electric devices 40 to 49. However, for the sake of convenience, it is assumed that the network managers 20 to 23 or the electric devices 40 to 49 perform those operations.

The network managers 20 to 23 continuously manage information on all LnCP based networked devices (or electric devices 40 to 49) using the HOMNET Profile, and provide network services to the user. The network managers 20 to 23 update the HOMNET Profile, on the basis of results of network configuration for setting an operating environment with all devices connected to the LnCP network and on the communications with normal devices after the completion of network configuration.

The HOMNET Profile includes a network manager-owned device profile, containing information on each networked electric device 40 to 49 and/or other network managers 20 to 23. The device profile is composed of a device information file (this contains information kept by a network manager 20 to 23 about other devices), a node parameter file, a device operation file, and a scenario file.

The device information file contains specific intrinsic information on each networked electric device 40 to 49, and is stored in nonvolatile memories of the electric devices 40 to 49. A network manager 20 to 23 acquires this information partially or collectively from individual electric device 40 to 49. Table 6 shows examples of information contained in the device information file.

TABLE 6

| Name | Type | Description |
| --- | --- | --- |
| Product name | ProductName | A name for a product |
| Maker name | MakerName | A name of a device maker |
| Model name | ModelName | A name of a device model |
| Software version | SWVersion | A version of software, including date (Yr/Mo/Day) created e.g.: 0x03 0x09 0x0A ~2003/09/10 |
| Device type | DeviceType | A type of a device e.g.: Network manager 1, Hybrid device 2, Slave device 3 |
| Product code | ProductCode | Product code |
| No. of service codes | NoOfSvcCode | No. of implemented service codes |
| Service code | SvcCode | Implemented service code |

In Table 6, the service code SvcCode indicates a kind of service executed by a corresponding electric device 40 to 49, and the No. of service codes NoOfSvcCode indicates the number of service codes SvcCode.

Next, the node parameter file is a record of data containing node parameters designated to each electric device 40 to 49 through the network configuration process, and is stored in nonvolatile memories of the electric devices 40 to 49. Again, a network manager 20 to 23 acquires this information partially or collectively from individual electric device 40 to 49. Table 7 shows examples of information contained in the node parameter file.

TABLE 7

| Name | Type | Description |
| --- | --- | --- |
| Product code | ProductCode | Product code |
| Logical address | LogicalAddress | Logical address |
| Cluster code | ClusterCode | Cluster code |
| Option value | OptionVal | Option value |
| Buffer size | BufferSize | An APDU communication buffer size in an application layer |
| Alive interval | AliveInt | Alive interval (sec) |
| Year | Year | |
| Month | Month | |
| Date | Date | |
| Hour | Hour | |
| Minute | Minute | |
| Second | Second | |

In Table 7, the option value is a value set for specific function in the above layers, and the alive interval AliveInt indicates a transmission interval time for an alive event message that the electric devices 40 to 49 (i.e., a slave device) send to the network managers 20 to 23 to notify their operational states (i.e., whether they are online or in operation currently).

The device operation file contains data on the operational states of devices. The network managers 20 to 24 receive from each of the electric devices 40 to 49 a message including an operational state of the device, and stores the messages in a nonvolatile memory. Table 8 shows examples of information contained in the device operation file.

TABLE 8

| Name | Type | Description |
| --- | --- | --- |
| Last alive event time | LastAliveEventTime | The time (minute) when the latest AliveEvent message is received. |
| Device state | DeviceState | 0: Offline, 1: Online |
| Status | Status | A detail status information when a device is online. 0: Standby, 1: Operating, 2: Pause 3: Error |
| Time out | TimeOut | In case of unicast, this is the time (ms) when a network manager (master device) waits for a response packet after having transmitted a request packet. |
| Location | Location | A code value indicating an installation location of a device (Initial value = 0) |

In Table 8, the last alive event time LastAliveEventTime is a variable for checking whether a device is offline, especially when an alive event message cannot be received during the alive interval AliveInt.

The scenario file contains data for defining supplementary services for each networked electric devices 40 to 49, and is stored in nonvolatile memories of the network managers 20 to 23. Table 9 shows information contained in the scenario file.

TABLE 9

| Name | Type | Description |
| --- | --- | --- |
| Event program type | EventProgramType | 0: An even program is stored in network managers; 1: An event program is stored in each device. |
| Program data | ProgramData | Data on an event program |
| Reservation service code | ReservSvcCode | A service code for program reservation. If there is no service code, use 0x00000000. |
| Reservation type | ReservType | 0: One-time reservation, 1: Persistent reservation. |
| Reservation data | ReservData | A file containing reservation data |

In Table 9, the event program decides an operation to be executed in correspondence to an event occurring to the devices (electric devices 40 to 49 or network managers 20 to 23). At this time, the user can set its ProgramData through the user interface of the network managers 20 to 23. The event program is stored in nonvolatile memories of the network managers 20 to 23 or the electric devices 40 to 49.

Further, the network managers 20 to 23 perform device reservations on the basis of time conditions of the related devices or status conditions of the network. Also, device operation(s) being reserved can be performed only once, or persistently and recurringly whenever the reservation condition is met.

One of the network manager 20 to 23 notifies the other network managers 20 to 23 of new/changed information in HOMNET Profile or the entire HOMNET Profile, whereby the HOMNET Profile of the other network managers 20 to 23 can be updated. Through this synchronization process, all of the network managers 20 to 23 have the same information and data on status of the electric devices 40 to 49 and/or other network managers 20 to 23. Therefore, when the user controls or monitors the electric devices 40 to 49 and/or other network managers 20 to 23 through a certain network manager 20 to 23, exactly the same operations are performed or the same results are obtained.

As explained earlier, the home network system of the present invention uses a control protocol which is a general communication standard for providing functions of controlling and monitoring electric devices.

Also, the home network system of the present invention uses the living network control protocol (LnCP) as a general communication standard.

Moreover, the home network system of the present invention is capable of performing batch processing on components of the entire home network system, and synchronizing information between a plurality of master devices in the home network system.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An electronic device, comprising:
an interface unit;
a processor configured to:
communicate with one other electronic device;
wherein a message communicated between the electronic device and the other electronic device includes a message type field and a transmission counter field;
wherein the message type field indicates a type of the message;
wherein the transmission counter field indicates how many times the same message is transmitted, and
wherein a range of a value included in the transmission counter field is determined based on the type of the message indicated by the message type field, wherein an upper limit of the range in a case that the type of the message is a request message or a notification message is higher than an upper limit of the range in a case that the type of the message is a response message;
receive, via the interface unit, a device information message from the other electronic device; and
generate a profile for managing the other electronic device based on the device information message,
wherein the profile comprises at least one of
a device information file containing specific information on the other electronic device,
a node parameter file containing a node parameter designated for the other electronic device,
a device operation file containing data on an operational state of the other electronic device, and
a scenario file for defining supplementary services for the other electronic device.

2. The device of claim 1, wherein the device information file comprises at least one of a name of the other electronic device, a name of device maker, a name of device model, a software version, a type of the device, a product code and implemented service code.

3. The device of claim 2, wherein the type of the device comprises one of a slave device, a master device, a network manager and a hybrid device.

4. The device of claim 1, wherein the node parameter file comprises at least one of a product code, a logical address, a cluster code, an option value, a communication buffer size, an alive interval and a set-up time.

5. The device of claim 1, wherein the device operation file comprises at least one of a device state, a detail status information, a waiting time for a response packet, and an installation location code.

6. The device of claim 5, wherein the device state is either an online or offline state.

7. The device of claim 5 or claim 6, wherein the detail status information is a status information when the electronic device is online.

8. The device of claim 7, wherein the detail status information is one of Standby, Operating, Pause and Error.

9. The device of claim 1, wherein the scenario file comprises at least one of an event program type, an event program data, a reservation service code, a reservation time and a reservation data.

10. The device of claim 9, wherein the event program type indicates a storage for the event program.

11. The device of claim 9, wherein the reservation type comprises a one-time reservation or a persistent reservation.

12. The device of claim 1, further comprises a second electronic device, and performs a synchronization process on the profile by transmitting/receiving changes in the profile between the electronic device and the second electronic device.

13. The device of claim 1, wherein
the range of the value included in the transmission counter field in a case that the type of the message is a request message is the same with the range of the value included in the transmission counter field in a case that the type of the message is a notification message.

* * * * *